United States Patent [19]

Worthy

[11] Patent Number: 4,948,550
[45] Date of Patent: Aug. 14, 1990

[54] STUD HOLE PLUG

[75] Inventor: David P. Worthy, Portersville, Pa.

[73] Assignee: Daden Products Corporation, Greensburg, Pa.

[21] Appl. No.: 301,666

[22] Filed: Jan. 25, 1989

[51] Int. Cl.$^5$ ............................................. G21C 13/06
[52] U.S. Cl. ..................................... 376/203; 411/384; 411/369; 411/34; 277/112; 138/89
[58] Field of Search ............... 376/203, 204, 260, 463; 411/383, 384, 369, 403, 404, 34, 35, 37, 38; 277/110, 112, 102, 108; 220/235; 138/89

[56] References Cited

U.S. PATENT DOCUMENTS

| | | | |
|---|---|---|---|
| 2,665,877 | 1/1954 | MacGregor | 220/235 |
| 4,432,394 | 2/1984 | Martin | 138/89 |
| 4,820,474 | 4/1989 | Leslie et al. | 376/203 |

Primary Examiner—Daniel D. Wasil
Attorney, Agent, or Firm—Webb, Burden, Ziesenheim & Webb

[57] ABSTRACT

A plug for sealing the internally threaded circular cylindrical stud holes in the flange of a nuclear reactor vessel during refueling comprises a circular cylindrical body of dense wear resistant polymer, a circular reaction plate axially spaced from one end face of the plug, an annular grommet of elastomer resistant to weak acid held between the reaction plate and the body having an exterior conical surface. A tool extends into the body and applies a torque for turning threads into the internal threads of the stud hole thus drawing the grommet into the stud hole such that it deforms against the interior of the stud hole and the surface of the flange adjacent the stud hole.

16 Claims, 2 Drawing Sheets

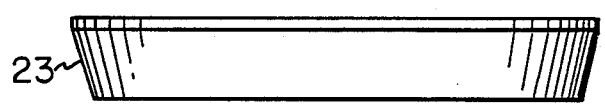
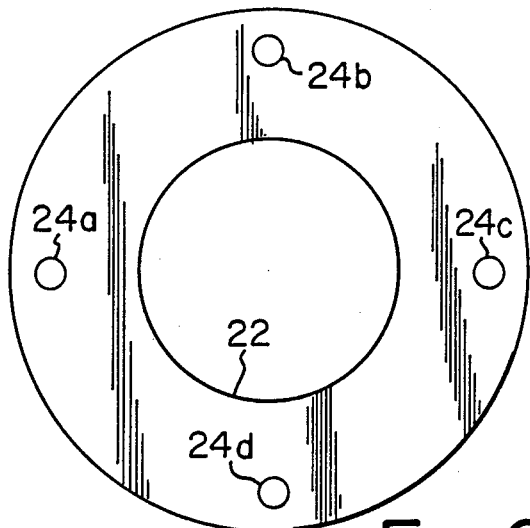
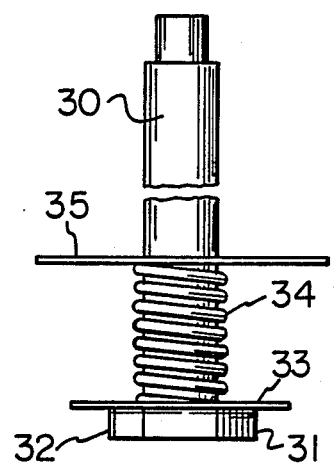
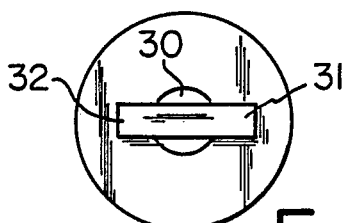
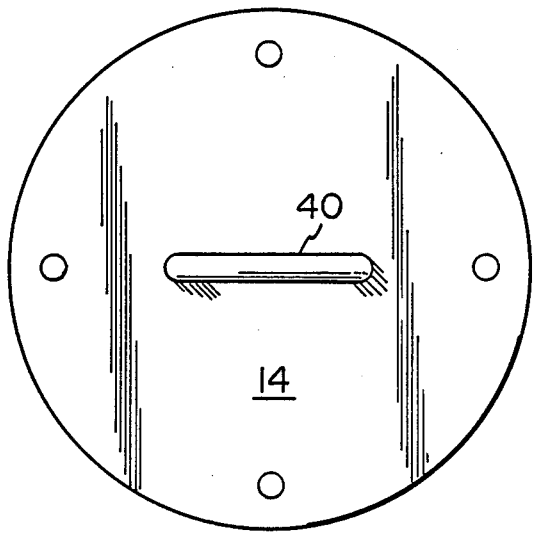
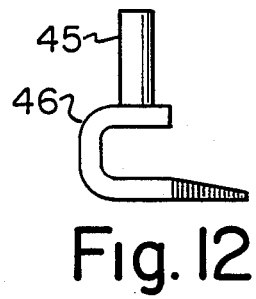
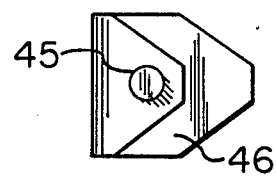
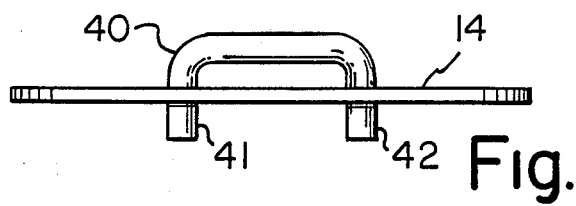

STUD HOLE PLUG

FIELD OF THE INVENTION

This invention relates to a novel plug for sealing stud holes in a nuclear reactor vessel flange during refueling.

BACKGROUND OF THE INVENTION

Typically, during refueling of a nuclear reactor, the space above the reactor vessel is flooded with boric acid to protect those working in the vicinity from radiation. The boric acid is extremely corrosive. Hence, it is desirable to plug the stud holes in the flange attached to the reactor vessel after the bolts holding the reactor vessel head (cover) have been removed but prior to flooding. Moreover, it is desirable to plug the stud holes before the cover is removed. Hence, stud hole plugs must be designed to pass through the holes in the flange of the reactor head.

Prior threaded plugs have been found to be difficult and time consuming to install and ineffective. For this reason, those in the art have sought to develope plugs without threads. See, for example, U.S. Pat. Nos. 4,312,708 and 4,671,518.

SUMMARY OF THE INVENTION

Briefly, according to this invention, a plug for sealing the internally threaded stud holes in the flange of a nuclear reactor vessel during refueling comprises a circular cylindrical body of dense wear resistant polymer having a cylindrical surface with external threads thereon sized for engaging the internal threads of the stud hole. The body also has two circular axial end faces having a diameter less than the diameter of the stud holes. A circular reaction plate is axially spaced from and secured to one axial end face of the plug. The reaction plate has a diameter greater than the diameter of the stud holes. An annular grommet of elastomer resistant to weak acid is held between the reaction plate and the body. The grommet has an exterior conical surface tapering from the diameter of the circular reaction plate to the diameter of the abutting circular axial end face of the body. A plurality of fasteners extend through the reaction plate and the grommet and into the body. A socket, handle or the like extends into the body for applying a torque to the body for turning its external threads into the internal threads of the stud hole thus drawing the grommet into the stud hole. As the grommet is drawn against the edge of the stud hole, it deforms against the interior of the stud hole and the surface of the flange adjacent the stud hole thus sealing it.

Preferably, the body is comprised of a material selected from the group consisting of high density nylon, high density polyethylene and high density polyureothane. The threads are undersized to allow for thermal expansion.

Preferably, the grommet is comprised of a material selected from the group neoprene, polyorganosiloxane, polyisoprene resins, butadiene polymers, styrene/butadiene polymers, polysulfide dihalide resins, polychloroprene compositions, polyisobutylene compositions, and polyvinylchloride resins. The grommet is at least about one inch thick.

Preferably, the reaction plate is a stainless steel. The diameter of the reaction plate is at least about 0.25 inch greater than the diameter of the stud hole.

It is preferred that extending from the axial end face of the body abutting the grommet there is an integral centered portion extending through the grommet toward the reaction plate. This portion cooperates with a socket, handle or the like for applying a threading torque to the plug. The grommet does not transfer torque from the socket, handle or the like to the plug body. The centered portion extends axially away from the remainder of the plug body just less than the thickness of the grommet such that the grommet is compressed. Most preferably, the thickness of the centered portion is at least about 0.03 inches less than the thickness of the grommet.

In one embodiment of this invention, the reaction plate has a central opening therein and the integral centered portion has a socket therein for receiving a tool for applying torque to the plug. The opening in the reaction plate is smaller than the socket such that the torquing tool can be inserted into the socket and rotated to a position engaging the plug and such that the tool then captures the plug so that it can be lifted by the tool.

In yet another embodiment of this invention, a handle is attached to the reaction plate and extending therethrough is secured in the integral centered portion extending from the body.

Still further there is provided, according to this invention, a system for sealing the internally threaded circular cylindrical stud holes in the flange of a nuclear reactor vessel during refueling comprising: a plurality of plugs as already described having sockets and a torquing tool having a head portion sized to pass through the openings in the reaction plates of the plugs and to engage the sockets. The torquing tool can be inserted into the socket and rotated to a position engaging the plug and the tool then captures the plug so that it can be lifted by the tool. Preferably, the torquing tool has a biased capture plate for abutting the reaction plate of the plugs when the tool has been inserted in the socket.

There is provided yet another system according to this invention for sealing the internally threaded circular cylindrical stud holes in the flange of a nuclear reactor vessel during refueling comprising: a plurality of plugs as already described having handles and a torquing tool having a grip portion sized to pass through the handles such that the torquing tool can be inserted into the handle and the tool then captures the plug so that it can be lifted by the tool.

BRIEF DESCRIPTION OF THE DRAWINGS

Further features and other objects and advantages will become clear from the following detailed description made with reference to the drawings in which:

FIG. 6 is a top view of a grommet of the plug according to this invention, FIG. 7 is a side view of the grommet of FIG. 6, FIG. 8 is a side view of a tool for placing a stud hole plug according to this invention, FIG. 9 is a bottom view of the tool of FIG. 8, FIG. 10 is a top view of an alternate embodiment of a reaction plate according to this invention, FIG. 11 is a side view of the reaction plate of FIG. 10, FIG. 12 is a side view of an alternate embodiment of an emplacement tool, and FIG. 13 is a top view of the tool of FIG. 12.

DESCRIPTION OF THE PREFERRED EMBODIMENTS

Figure 1:
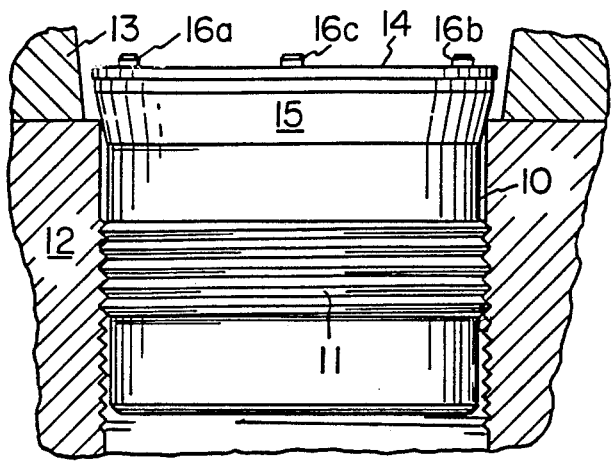
FIG. 1 is a side view of a stud hole plug according to this invention shown in a sectioned reactor vessel flange.
Figure 2:
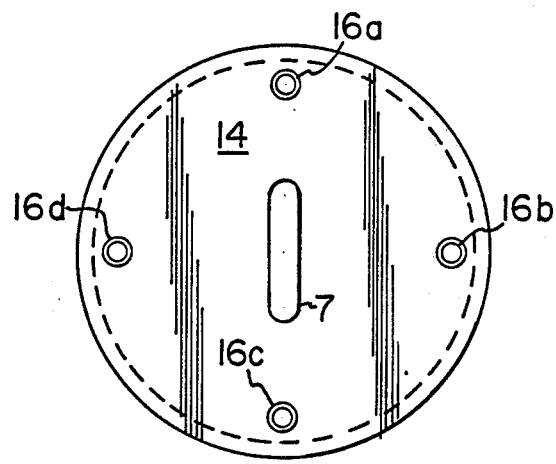
FIG. 2 is a top view of the stud hole plug of FIG. 3 is a side view of the body of the plug according to this invention.

Referring now to FIG. 1, there is shown a side view of an assembled nuclear reactor stud hole plug according to this invention. The plug comprises a cylindrical body 10 having threads 11 along at least a portion of the cylindrical wall thereof. In a typical reactor, the stud holes have a diameter of about seven inches and the stud hole plugs necessarily have about the same diameter. Typically, the plugs would have an axial length of about six inches. It should be understood that the size of the stud hole plugs depends upon the configuration of the reactor and the precise dimensions form no part of this invention. The plug is shown in sectioned portions of the reaction vessel flange 12 and head flange 13. Spaced from one end of the plug (the top in FIG. 1) is a metal reaction plate 14 which holds a beveled resilient grommet 15 against the plug body 10. Referring now to FIGS. 1 and 2, a plurality of bolts 16a, 16b, 16c, 16d hold the reaction plate 14 against the beveled resilient seal 15. In the reaction plate is an opening 7 that permits a tool to be inserted in a socket provided in the plug so that the plug can be turned into or out of the stud hole.

In a typical refueling procedure, the metal studs holding the reaction head flange 13 against the reaction vessel flange 12 are removed. The stud hole plugs are threaded into the stud holes and tightened down until the resilient seal engages the inside of the stud hole, the flange surface adjacent the stud hole and the rim therebetween to thus provide a three way seal. Because of this three way seal, the plug and flange can sustain substantial damage before a seal will not be effected. Typically, the next step of the refueling is removal of the reactor head and flooding of the space above the reactor with borated water (boric acid). The seal provided by the stud hole plug prevents the corrosive liquid from entering and corroding the internal threads in the stud hole. After refueling, the borated water is pumped away and the head is replaced prior to removal of the plugs and insertion of the studs.

Figure 3:
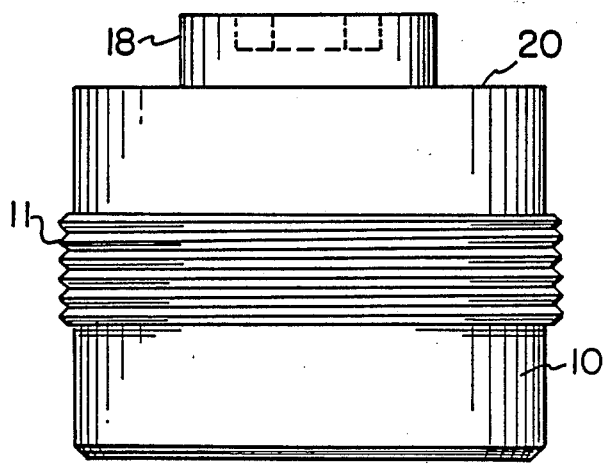
Figure 4:
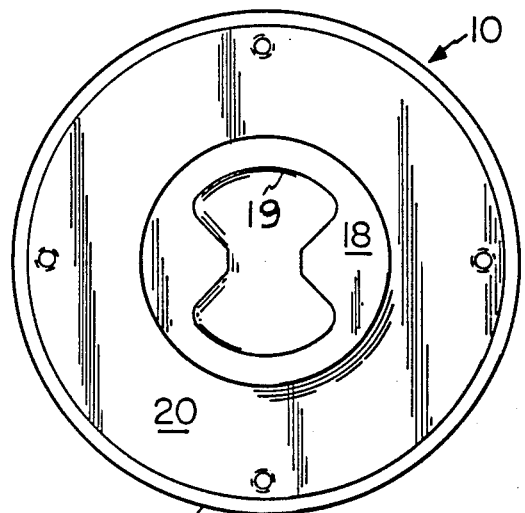
FIG. 4 is a top view of the body of FIG. 3.

Referring to FIGS. 3 and 4, the plug 10 is made from a polymer such as high density nylon. Typically, the cylindrical plug body has undersized threads 11 to accommodate thermal expansion. At one axial end and centered thereon there is a raised portion 18 of lesser diameter. In the case of a stud hole plug having a diameter of about seven inches, the raised portion may, for example, have a diameter of about 3.5 inches and an axial depth of about one inch. The axial end of the raised centered portion 18 has a socket 19 therein. The socket is sized to receive a tool for applying torque to the plug for turning it into and out of the stud hole. Preferably, the socket in the center portion has a butterfly configuration as shown in FIG. 4. This socket configuration will cooperate with the driving tool to be described with reference to FIGS. 8 and 9. A plurality of circumferentially spaced stud holes are provided on the axial shoulder 20 between the raised portion and the cylindrical wall of the plug for receiving fasteners 16 to hold the reaction plate 14 in place.

Figure 5:
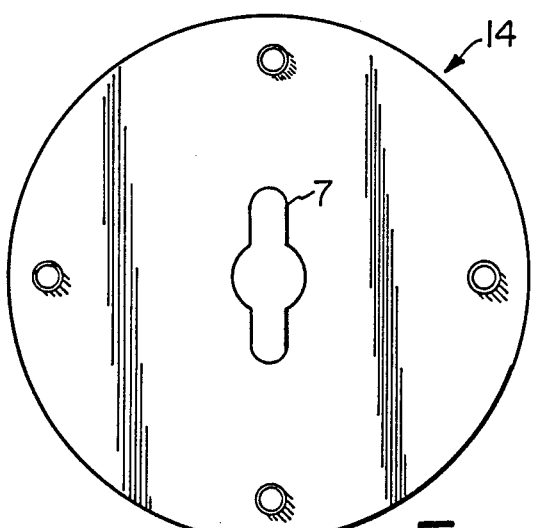
FIG. 5 is a top view of a reaction plate of the plug according to this invention.

Referring now to FIG. 5, the reaction plate has a circular shape with a diameter somewhat greater than the stud holes in the reactor vessel flange and somewhat smaller than the through holes in the reactor head flange. The diameter of the reaction plate is the largest diameter of the stud hole plug and therefore, the plug can be turned into the stud holes without removing the head and thereafter the head can be removed with the plugs in place. The diameter of the reaction plate is at least about 0.25 inch greater than the diameter of the stud hole. The reaction plate has an opening 7 therein for permitting a torquing tool to pass through and engage the socket in the raised center portion of the plug body. The particular hole depicted has a circular center portion and two opposite radially extending portions to permit a tool with shaft 30 and two wing extensions 31 and 32 (See FIGS. 8 and 9) to pass therethrough and engage the socket walls. Preferably, the reaction plate is stainless steel.

Referring now to FIGS. 6 and 7, the grommet 15 is shown to have an annular configuration with a central opening 22 so that it can surround the raised center portion 18 of the plug body and rest between the reaction plate 14 on the shoulder 20 surrounding the raised center portion. Preferably, the grommet is comprised of a weak acid resistant material such as neoprene, polyorganosiloxane, polyisoprene resins, butadiene polymers, styrene/butadiene polymers, polysulfide dihalide resins, polychloroprene compositions, polyisobutylene compositions, and polyvinylchloride resins. The grommet is at least about one inch thick. The grommet has an exterior conical surface 23 tapering from a diameter equal to the diameter of the circular reaction plate to a diameter equal to the diameter of the edge of the shoulder of the body. The grommet, while deformable, is impervious to liquids. Circumferentially spaced through holes 24a, 25b, 24c, and 24d are provided to receive the fasteners 16 securing the reaction plate to the plug body. The grommet is about 0.03 inches thicker than the raised portion of the plug body. Thus, when the reaction plate is tightened against the raised portion, it slightly squeezes the grommet. The axial distance between the shoulder of the body and the reaction plate is fixed by the height of the raised portion of the plug and thus the grommet can only be squeezed the desired distance.

Referring to FIGS. 8 and 9, a torquing tool especially for use with the reaction plug thus far described has an elongate shaft 30 with wing portions 31 and 32 at one axial end sized to pass through the opening in the reaction plate and then into the socket. The depth of the wings is such to permit the rotation of the tool after it has been inserted through the hole in the reaction plate to thus engage the sides of the socket. An annular capture plate 33 is positioned for axial movement away from the wing portions 31 and 32. The capture plate is biased by spring 34 anchored by guide plate 35 fixed to the shaft. Thus, when the tool is inserted in the socket, the capture plate engages the surface of the reaction plate of the plug and the spring is compressed. After the tool is rotated to engage the sides of the socket, the reaction plate is captured between the wings and the capture plate. This enables the tool to be used to raise and lower a stud hole plug into place. The grommet plays no structural role in the raising, lowering or torquing of the stud hole plug into place because the body of the stud hole plug is directly engaged by the tool.

Referring now to FIGS. 10 and 11, there is shown an alternate embodiment of a reaction plate for a plug according to this invention. The reaction plate 14 has a handle 40 rather than an opening. No socket is provided in the raised portion of the plug body with which this reaction plate is used. The handle has extensions 41 and 42 that extend through the plate so that they can be inserted in bores provided in the raised portion of the plug body. Lifting or turning the handle applies a lifting force or turning torque directly upon the plug body. Referring to FIGS. 12 and 13, there is shown a tool for manipulating the stud hole plug according to the embodiment of FIGS. 10 and 11. The tool has an elongate shaft 45 with an end piece sized to slide between the handle 40 and the reaction plate 14.

Having thus described my invention with the detail and particularity required by the patent laws what is desired to be protected by Letters Pat. is set forth in the following claims:

I claim:

1. A plug for sealing the internally threaded circular cylindrical stud holes in the flange of a nuclear reactor vessel during refueling comprising
   (a) a circular cylindrical body of dense wear resistant polymer having a cylindrical surface with external threads thereon sized for engaging the internal threads of the stud hole, said body having two circular axial end faces having a diameter less than the diameter of the stud holes,
   (b) a circular reaction plate axially spaced from and secured to one axial end face of the plug, said reaction plate having a diameter greater than the diameter of the stud holes,
   (c) an annular grommet of elastomer resistant to weak acid held between the reaction plate and one axial end face having an exterior conical surface tapering from the circular reaction plate to the abutting circular axial end face of the body,
   (d) a plurality of fasteners extending through the reaction plate, the grommet and into the body, and
   (e) means extending into the body for applying a torque to the body for turning its external threads into the internal threads of the stud hole thus drawing the grommet into the stud hole such that it deforms against the interior of the stud hole and the surface of the flange adjacent the stud hole.

2. The plug according to claim 1 in which the body is comprised of a material selected from the group consisting of high density nylon, high density polyethylene and high density polyurethane.

3. The plug according to claim 2 wherein the threads are undersized to allow for thermal expansion.

4. The plug according to claim 1 in which the grommet is comprised of a material selected from the group neoprene, polyorganosiloxane, polyisoprene resins, butadiene polymers, styrene/butadiene polymers, polysulfide dihalide resins, polychloroprene compositions, polyisobutylene compositions, and polyvinylchloride resins.

5. The plug according to claim 1 in which the grommet is at least one inch thick.

6. The plug according to claim 1 in which the reaction plate is a stainless steel plate.

7. The plug according to claim 6 in which the diameter of the reaction plate is at least 0.25 inch greater than the diameter of the stud hole.

8. The plug according to claim wherein extending from the axial end face of the body abutting the grommet there is an integral centered portion extending through the grommet toward the reaction plate for cooperating with the means for applying a threading torque to the plug.

9. The plug according to claim 8 wherein the integral centered portion extends axially away from the remainder of the plug body just less than the thickness of the grommet such that the grommet is compressed.

10. The plug according to claim 9 wherein the integral portion extends at least about 0.03 inches less than the thickness of the grommet.

11. The plug according to claim 8 wherein the reaction plate has a central opening therein and the integral centered portion has a socket therein for receiving a tool for applying torque to the plug.

12. The plug according to claim 11 wherein the opening in the reaction plate is smaller than the socket such that the torquing tool can be inserted into the socket and rotated to a position engaging the plug and such that the tool then captures the plug so that it can be lifted by the tool.

13. The plug according to claim 8 wherein a handle attached to the reaction plate and extending therethrough is secured in the integral centered portion extending from the body.

14. A system for sealing the internally threaded circular cylindrical stud holes in the flange of a nuclear reactor vessel during refueling comprising:
   a plurality of plugs having
   (a) a circular cylindrical body of dense wear resistant polymer having a cylindrical surface with external threads thereon sized for engaging the internal threads of the stud hole, said body also having two circular axial end faces having a diameter less than the diameter of the stud holes,
   (b) a circular reaction plate axially spaced from and secured to one axial end face of the plug, said reaction plate having a diameter greater than the diameter of the stud holes, and
   (c) an annular grommet of elastomer resistant to weak acid held between the reaction plate and one axial end face having an exterior conical surface tapering from the circular reaction plate to the abutting circular axial end face of the body,
   (d) a plurality of fasteners extending through the reaction plate, the grommet and into the body,
   (e) a raised portion extending from the axial end face of the body abutting the grommet being centered and integral with the body, said raised portion extending through the grommet toward the reaction plate,
   (f) the reaction plate having an opening and the integral centered portion having a socket therein for receiving a tool for applying torque to the plug for turning the external threads of the body into the internal threads of the stud hole thus drawing the grommet into the stud hole such that it deforms against the interior of the stud hole and the surface of the flange adjacent the stud hole, and
   (g) the opening in the reaction plate being smaller than the socket and a torquing tool having a portion sized to pass through the openings in the reaction plates of the plugs and to engage the sockets in the raised portions thereof, such that the torquing tool can be inserted into the socket and rotated to a position engaging the plug and such that the tool then captures the plug so that it can be lifted by the tool.

15. The system according to claim 14 wherein the torquing tool has a biased capture plate for abutting the reaction plate of the plugs when the tool has been inserted in the socket.

16. A system for sealing the internally threaded circular cylindrical stud holes in the flange of a nuclear reactor vessel during refueling comprising:

a plurality of plugs having
- (a) a circular cylindrical body of dense wear resistant polymer having a cylindrical surface with external threads thereon sized for engaging the internal threads of the stud hole, said body also having two circular axial end faces having a diameter less than the diameter of the stud holes,
- (b) a circular reaction plate axially spaced from and secured to one axial end face of the plug, said reaction plate having a diameter greater than the diameter of the stud holes, and
- (c) an annular grommet of elastomer resistant to weak acid held between the reaction plate and one axial end face having an exterior conical surface tapering from the circular reaction plate to the abutting circular axial end face of the body,
- (d) a plurality of fasteners extending through the reaction plate, the grommet and into the body,
- (e) a raised portion extending from the axial end face of the body abutting the grommet being centered and integral with the body, said raised portion extending through the grommet toward the reaction plate,
- (f) the reaction plate having an opening and the integral centered portion having a handle secured thereto for receiving a tool for applying torque to the plug for turning the external threads of the body into the internal threads of the stud hole thus drawing the grommet into the stud hole such that it deforms against the interior of the stud hole and the surface of the flange adjacent the stud hole, and
- (g) a torquing tool having a portion sized to pass through the handle such that the torquing tool can be inserted into the handle and the tool then captures the plug so that it can be lifted by the tool.

* * * * *

UNITED STATES PATENT AND TRADEMARK OFFICE
CERTIFICATE OF CORRECTION

PATENT NO. : 4,948,550

DATED : August 14, 1990

INVENTOR(S) : David P. Worthy

It is certified that error appears in the above-identified patent and that said Letters Patent is hereby corrected as shown below:

Claim 8 Line 67 Column 5 after "claim" insert --1--.

Signed and Sealed this

Twenty-first Day of January, 1992

Attest:

HARRY F. MANBECK, JR.

*Attesting Officer*      *Commissioner of Patents and Trademarks*